United States Patent
Nikhra et al.

(10) Patent No.: US 10,295,982 B2
(45) Date of Patent: May 21, 2019

(54) DETECTING AND TRACKING CHANGES IN ENGINEERING CONFIGURATION DATA

(71) Applicant: Honeywell International Inc., Morris Plains, NJ (US)

(72) Inventors: Abhishek Nikhra, Karnataka (IN); Ramakrishnan Ganapathi, Karnataka (IN); Manas Dutta, Karnataka (IN); Kiran N, Karnataka (IN); Ravi Kumar R, Karnataka (IN)

(73) Assignee: Honeywell International Inc., Morris Plains, NJ (US)

( * ) Notice: Subject to any disclaimer, the term of this patent is extended or adjusted under 35 U.S.C. 154(b) by 398 days.

(21) Appl. No.: 15/177,844

(22) Filed: Jun. 9, 2016

(65) Prior Publication Data
US 2017/0357232 A1  Dec. 14, 2017

(51) Int. Cl.
*G05B 19/042* (2006.01)

(52) U.S. Cl.
CPC ........... *G05B 19/0428* (2013.01); *G05B 2219/25074* (2013.01)

(58) Field of Classification Search
CPC .......... G05B 19/048; G05B 19/042; G05B 2219/25064; G05B 19/0428; G05B 2219/25074; Y02P 90/02
USPC ........................................... 707/758
See application file for complete search history.

(56) References Cited

U.S. PATENT DOCUMENTS

| | | | |
|---|---|---|---|
| 2002/0128731 A1* | 9/2002 | Wegerich | G05B 17/02 700/31 |
| 2007/0283030 A1 | 12/2007 | Deininger et al. | |
| 2014/0280678 A1 | 9/2014 | Nixon et al. | |
| 2015/0081805 A1 | 3/2015 | Bruce et al. | |
| 2015/0156072 A1 | 6/2015 | Kirrmann | |
| 2016/0357176 A1* | 12/2016 | Chand | G05B 19/4185 |

FOREIGN PATENT DOCUMENTS

| | | | |
|---|---|---|---|
| EP | 2590038 A2 | 5/2013 | |
| JP | 2005317002 A | 11/2005 | |

* cited by examiner

*Primary Examiner* — Evan Aspinwall

(57) ABSTRACT

A method of detecting and tracking changes in engineering configuration data (ECD) for control and instrumentation (C&I) systems an industrial facility. First ECD in a first data format used in a first C&I system and second ECD in a second data format used in a second C&I system are converted into a common format. The first and second ECD are stored together as reference snapshot data with a timestamp in a single information source. At a second time, after the first time reflected in the timestamp, the first and second ECD are obtained. The first ECD and the second ECD obtained at the second time are converted into the common format that collectively provides updated snapshot data. Changes are detected between the first ECD and the second ECD by comparing the reference snapshot data to the updated snapshot data.

13 Claims, 7 Drawing Sheets

DETECTING AND TRACKING CHANGES IN ENGINEERING CONFIGURATION DATA

FIELD

Disclosed embodiments relate to computers used with processing facilities and more specifically relate to detecting and tracking changes in engineering configuration data for control and instrumentation systems in an industrial facility.

BACKGROUND

Processing facilities are often managed using process control systems also known as control and instrumentation (C&I) systems. Processing facilities can include manufacturing plants, chemical plants, crude oil refineries, ore processing plants, and paper or pulp manufacturing plants. These industries typically use continuous processes and fluid processing. C&I systems typically manage the use of motors, valves, sensors, gauges and other industrial equipment in the processing facilities. A manufacturing plant or refinery may have several C&I systems such as one or more distributed control systems (DCS), programmable logic controls (PLC), safety system and applications for controlling different processes.

In modern plant engineering, there are C&I systems which include C&I devices that link all plant components. The C&I devices include input/output (I/O) modules that generally receive physical parametric (e.g., pressure, temperature) representations from sensors as standard current signals (4 to 20 mA). These signals are utilized by other various C&I devices including for regulating, safety, data acquisition and comparator systems for control, safety and instrumentation purposes. Specifically, conventionally various comparators compare the incoming 4-20 mA signals received from sensors against stored/set "set points" and create outputs used for plant safety, regulation, interlock or/and operation.

SUMMARY

This summary is provided to introduce a brief selection of disclosed concepts in a simplified form that are further described below in the Detailed Description including the drawings provided. This Summary is not intended to limit the claimed subject matter's scope. Disclosed embodiments comprise a method of automatically detecting and tracking changes in engineering configuration data (ECD) for control and instrumentation (C&I) systems in an industrial facility (IF, or a plant) that include C&I systems that utilize different formats for their ECD. As used herein, a C&I system and a control system are synonymous.

The respective C&I systems comprising DCS, PLC, Safety system and applications for controlling the different processes run in the IF may collectively be from different vendors. Each C&I system thus may use different format to structure its ECD. Some C&I systems may use a flat file, database system or a propriety method to store their ECD. Different versions of C&I systems (e.g., legacy DCS and newer DCS) may also have changes in the format and storage of ECD. It is thus known to be difficult to create an information system per C&I system that matches the format and storage methods used in the respective C&I systems.

The file formats in the respective C&I systems for their ECD for example can be binary, text or XML-based. If file format is a relational database, then the information is stored in terms of records. Each C&I system can have different data storage mechanisms such as the relational databases SQL server or ORACLE, flat files, access databases or DBF files. Each C&I system can have different physical networks and/or a different communication protocol such as TCP/IP, controlNet, Ethernet/IP and foundation fieldbus. ECD as used herein is broad term that includes essentially all aspects of engineering performed in the C&I systems of an IF.

A snapshot is a copy of ECD of at least one C&I system at a particular point in time. A conventional snapshot of the ECD for the C&I systems in an IF include a representation for objects, connections and associations therein collected at a point in time which can run into several GBs of data. Such large amounts of data can negatively impact performance and scalability of the application requiring large storage and processing resources to handle such large data costing the IF owner. Identifying changes amidst various versions (snapshots) of ECD is thus known to be significant problem. The large size of snapshots and different formats in the C&I systems add to this problem. It is recognized to not be practical to create separate sets of methods for every C&I system for detecting across snapshots. Tracing, reporting, enabling analysis and documenting the changes is still more difficult. A snapshot collection may also run for several hours and it may fail at different points.

Disclosed embodiments provide an information system that uses a common generic format to store ECD which has representation for objects, connections and associations found in C&I systems that enables a single information source to store ECD collected from different C&I systems. The common generic format is the basis for detecting changes in the new (updated) snapshot data, which can use the ID and the Hash method to detect changes so that there is a need to store complete snapshot data only for the first snapshot taken. Disclosed embodiments thus overcome that above-described problems with conventional snapshot collection.

The method includes the IF including a first C&I system utilizing a first data format for its first ECD and at least a second C&I system utilizing a second data format for its second ECD that is different from the first data format. The first ECD and the second ECD each include representations for objects, connections, and associations. The first ECD and the second ECD each obtained at a first time are converted into a common format.

The first ECD and the second ECD obtained at the first time are stored together as reference snapshot data with a timestamp reflecting the first time in a single information source that uses the common format. As used herein, a disclosed "snapshot" refers to ECD collected from all the C&I systems in an IF including representation for objects, connections and associations timestamped. At a second time, after the first time the first ECD and the second ECD are obtained, the first ECD and the second ECD are obtained and are converted into the common format that collectively provide updated snapshot data having the common format. Change(s) are detected between the first ECD and the second ECD obtained at the first time and the first ECD and the second ECD obtained at the second time by comparing the reference snapshot data to the updated snapshot data.

Another disclosed embodiment comprises a system for automatically detecting and tracking changes in ECD for C&I systems in an IF. The system includes a data server including a first processor connected to a memory device having a first non-transitory machine-readable storage medium that stores a data storage module. The IF includes a first C&I system utilizing a first data format for its first ECD and at least a second C&I system utilizing a second data format for its second ECD that is different from the first data format. The first ECD and second ECD each include representations for objects, connections, and associations.

The processor executes the data storage module causing the data server to convert the first ECD and the second ECD, each obtained at a first time into a common format. The first ECD and second ECD obtained at the first time are stored together as reference snapshot data with a timestamp reflecting the first time in a single information source that uses the common format. At a second time, after the first time, the first ECD the second ECD are obtained. The first ECD and the second ECD obtained at the second time are converted into the common format to collectively provide updated snapshot data having the common format. Change(s) are detected between the first ECD and the second ECD obtained at the first time and the second ECD obtained at the second time by comparing the reference snapshot data to the updated snapshot data.

DETAILED DESCRIPTION

Figure 1A:
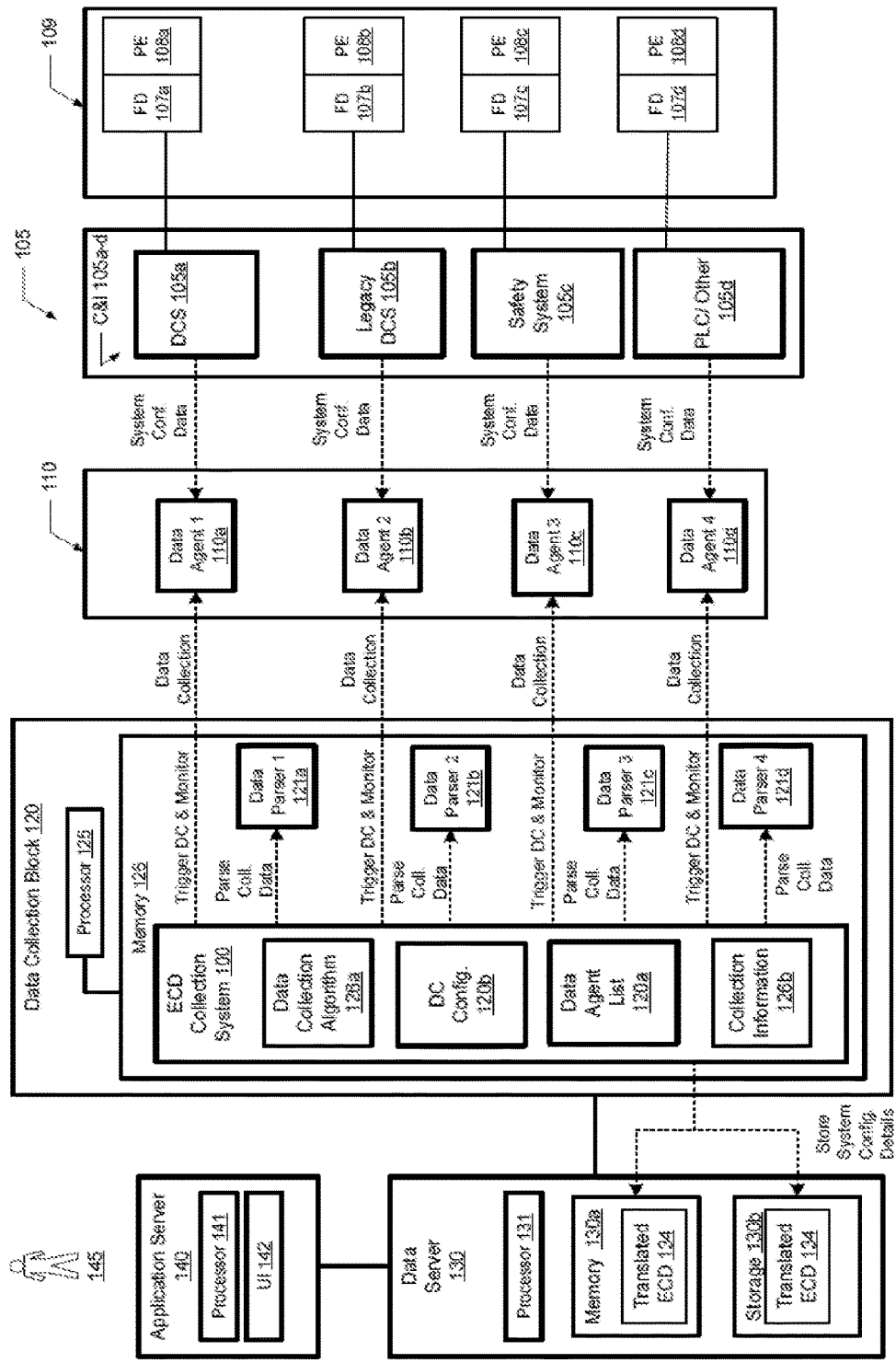
FIG. 1A is a diagrammatic view of a framework of hardware and software components including a system for collecting ECD from the respective C&I systems of an IF, according to an example embodiment.

Disclosed embodiments are described with reference to the attached figures, wherein like reference numerals are used throughout the figures to designate similar or equivalent elements. The figures are not drawn to scale and they are provided merely to illustrate certain disclosed aspects. Several disclosed aspects are described below with reference to example applications for illustration. It should be understood that numerous specific details, relationships, and methods are set forth to provide a full understanding of the disclosed embodiments.

One having ordinary skill in the relevant art, however, will readily recognize that the subject matter disclosed herein can be practiced without one or more of the specific details or with other methods. In other instances, well-known structures or operations are not shown in detail to avoid obscuring certain aspects. This Disclosure is not limited by the illustrated ordering of acts or events, as some acts may occur in different orders and/or concurrently with other acts or events. Furthermore, not all illustrated acts or events are required to implement a methodology in accordance with the embodiments disclosed herein.

Disclosed embodiments provide a method, system and computer program product for automatically detecting and tracking changes in ECD for an IF using disclosed data agents and data parser pairs that are each customized to provide the capability to extract data C&I systems which have different data or information sources that collectively utilize at least different file formats. As described above, the C&I systems may also utilize different data storage mechanisms.

The C&I elements include computer nodes including servers, operator consoles and various networking devices switch, routers, firewalls. Regarding ECD, each of these C&I elements have properties that are configured to control their behavior. These elements along with their properties and their values are part of the ECD. An IF is divided into area, unit, and sub-units where each division is responsible for certain processing. Details about these divisions are part of the ECD details. Disclosed data parsers have the data format and syntax information used in their respective C&I system built or coded therein. This data format and syntax information can be gathered from highly skilled individuals that perform detailed analysis of the respective C&I system during development of each parser that enables retrieving the ECD from their respect C&I system. The ECD are stored after being translated by a data collection block into the data server, generally being stored with a timestamp.

ECD details include a name or tag associated with different hardware and software elements in the IF for their identification. The hardware elements are physical connected to one or more communication networks. ECD includes information about how these elements are connected which is reflected in a network topology. ECD includes instrumentation details for example, field wirings from devices through junction box, marshalling cabinet to the process controller. Operator displays that are created in the system, include what graphical elements are used to create the displays, tags and values that are shown in the displays. ECD includes logic created in the C&I system, simulation system or applications used to control the processing in the IF. ECD also includes details about the logic, type of logic, control flow, graphical representation and connections, as well as the data flow between C&I systems along with details of the physical medium and communication protocol used.

FIGS. 1A and B show an example ECD collection system 100 that automatically collects ECD from the different C&I systems 105a-d collectively having different data file formats in an IF 105. The software for ECD collection system 100 is stored in memory 126 that is part of data collection block 120. The IF 105 comprises the blocks shown in FIG. 1A including the application server 140, data server 130, C&I systems 105a-d, and the process unit block 109 controlled by the C&I systems 105a-d, as well as many other elements within the IF that are not shown.

The C&I systems are shown including a plurality of C&I systems 105a-d including a first DCS 105a, a legacy DCS 105b, a safety system 105c (including safety controllers, and network interface modules (NIMs)), and Programmable Logic Controller (PLC) or other controller 105d. As known in the art, the DCS 105b and PLC 105d each include at least one process controller, and at least one input/output (I/O). A PLC is generally used for control of small package processing equipment items such as compressors, and pumps. A PLC comprises a PLC controller along with related IO modules. The C&I systems includes at least one (and in some cases all) of first DCS 105a, legacy DCS 105b, safety system 105c, and PLC or other controller 105d. Each of the C&I systems 105a-d store their respective ECD.

Figure 1B:
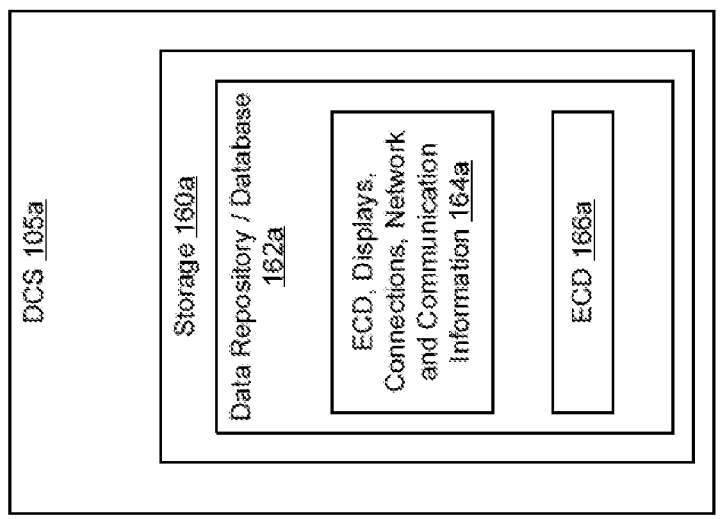
FIG. 1B is a block diagram of a storage portion of a C&I system shown as a DCS, where the information stored in the storage includes the ECD for its associated C&I system, according to an example embodiment.

A process unit block 109 includes processing equipment 108a, 108b, 108c and 108d (boilers, compressors, and pumps) configured for implementing an industrial process, a plurality of field devices (actuators and sensors, such as for sensing temperature and pressure) shown as 107a, 107b, 107c and 107d coupled to the processing equipment and to respective C&I systems 105a, 105b, 105c and 105d. As noted above, the C&I system devices include I/O modules that generally receive physical parametric (e.g., pressure, temperature) representations from sensors, and other C&I devices use these representations for regulating, safety, data acquisition and comparator systems for control, safety and instrumentation purposes. Each of the C&I systems 105a-d includes a storage device 160a (see FIG. 1B). FIG. 1B only shows storage device 160a for storing ECD data for C&I system 105a. Storage device 160a includes a data repository/database 162a (e.g., in the memory of a server) that stores ECD 166a. Each of the C&I systems 105a, 105b, 105c and 105d can also store their respective ECD in a respective data repository (e.g., in the memory of a server).

ECD collection system 100 includes a data agents block 110 shown including data agents associated with each C&I system including data agent 1 110a, data agent 2 110b, data agent 3 110c and data agent 4 110d, shown receiving ECD from the first DCS 105a, legacy DCS 105b, safety system 105c, and PLC or other controller 105d, respectively. The respective data agents (110a, 110b, 110c and 110d) and data parsers 121a-121d each have the knowledge of the data format used in respective C&I system that they are associated with from which the network configuration (or topology) that needs to be collected including the network type used (e.g., Ethernet, fault tolerant Ethernet (FTE), a Local Control Network (LCN) or a wireless network) and the communication method used by the C&I system. As noted above, this information can be gathered from highly skilled individuals that perform detailed analysis of the respective C&I systems during development of each parser.

As noted above, the data parsers have the data format and syntax information used in their respective C&I system built or coded therein. Each of the data agents can have custom information regarding the C&I system they are associated with, such as information regarding the location of the ECD stored in their associated C&I system.

The network type and communication method used by each C&I system 105a-105d including their and C&I system are generally stored by each C&I system differently, such as in one or more engineering repositories such as data repository/database 162a shown in FIG. 1B. The data agents also have information regarding the location of the ECD stored in each C&I system.

As noted above, each of the C&I 105a-d includes a storage device 160a (FIG. 1B). FIG. 1B shows only shows storage device 160a for DCS 105a. Storage device 160a includes a data repository/database 162a that stores ECD 166a, displays, connections, network and communication information 164a. Similarly, other storage devices 160b-d (not shown) would store data repository/databases 162b-d (not shown). Disclosed data agents 110a-d extract this ECD information from their respective C&I system along with the references.

ECD collection system 100 has some collection information 126b (typically stored in memory 126 as shown in FIG. 1A provided during initial setup by end users (called "data collection setting") that includes collection information including a location (e.g. the node) that stores the ECD for the C&I system and the file format used in the C&I system including connectivity details such as the machine name and IP address where the ECD and associated data is stored and generally also credentials to connect to the system to their respective data agents (110a, 110b, 110c and 110d).

Using this collection information 126b (location the ECD is stored and a file format used) provided from the data collection setting, ECD 100 will automatically initiate a collecting data process. In the case of an EXPERION controller the communication method is star-based Fault Tolerant Ethernet (FTE), in the case of TPS/Protocol Conversion Application (PCA) controller it is a physical bus/logical ring token pass-based communication. The data agents 110a-d in the data agents block 110 are responsible for discovering the respective nodes in the network and the interconnection of the nodes in the C&I system that they are associated with. The data agents block 110 is designed for each C&I system and contains code that has knowledge of how the C&I system works and how it stores the ECD.

Each C&I system (DCS 105a, legacy DCS 105b, safety system 105c, and PLC or other controller 105d) may employ one or more network types which can be standard networks such as Ethernet or a propriety communications network. The data agents 110a-d have knowledge of the file format from the C&I system whose ECD are being collected for system documentation (e.g., ECD is obtained from one or more data repositories/databases 162a-d from which connections and references needs to be collected). In this case, disclosed data agents 110a-d may use different discovery methods for different C&I systems (e.g., one method for the DCS 105b and another method for PLC 105d) and for different communications network types.

Data agents block 110 is remotely triggered on the node that is connected to the C&I system 105a-d. The data agents block 110 can be developed in a technology that is compatible with the technology platform (e.g., some DCS systems might be running on a different operating system (OS) such as LINUX, UNIX, etc.), so that the respective data agents 110a-d are each compatible with the operating system of the particular C&I system they are associated with. New data agents for the data agents block 110 can be developed and deployed to support the release of a new C&I system (e.g., a new DCS version).

Data collection (DC) block 120 includes ECD system 100. ECD collection system 100 provides data collection service functionality within data collection block 120. The DC block 120 is responsible for starting and tracking the actual ECD collection service activity of the C&I system provided by the data agents block 110. The ECD collection system 100 includes data agent list 120a that stores a list of all data agents 110a-d which are registered with ECD collection system 100, and which of the data agents is applicable for which C&I system along with the version of the C&I system. The ECD collection system 100 includes data collection (DC) configuration block 120b which stores a list of the C&I systems from which ECD needs to be collected, connectivity information to be used to connect to the, and credentials (needed to access the C&I system, for security) to be used by the data agents in data agents block 110 to obtain access to the ECD. The DC block 120 also includes data parsers 121a-d stored in memory 126 that operate after the data agents 110a-d have collected ECD from their respective C&I system.

For each C&I system (105a-d), the DC block 120 starts the respective data agent 110a, 110b, 110c, 110d in the data agents block 110. DC block 120 starts a data parser (121a, 121b, 121c, 121d) after the respective data agents 110a, 110b, 110c, 110d have collected ECD from their associated C&I system. The data parsers 121a-d have knowledge of the format and syntax of data used in the C&I system. The data parsers are responsible for parsing and converting connections and references in C&I system format into a common generic format which is stored in the information system which is represented as one or both of memory 130a and storage 130b of the data server 130 in FIG. 1A. In one embodiment, storage 130b can be a hard drive device that can contain multiple databases. As noted above, the ECD information stored generally includes a timestamp.

During execution, the data agents 110a-d transmit ECD 166a-d to DC block 120 and also send a status message asynchronously to indicate the current status and progress of data collection. The data parsers 121a-d convert or translate the collected ECD 166a-d from each of the C&I systems 105a-d into a common generic format (translated ECD) and stores the translated ECD 134 to memory 130a and/or storage 130b of the data server 130. Data server 130 includes a processor 131.

Data parsers 121a-d can access information regarding the connections used in their associated C&I including physical and logical connections, where network connections are a type of physical connection. The connection information is generally stored in a database in the memory 130a of the data server 130. For each connection, information about the two ends of the connection are also stored. This information about the two ends of the connection helps in locating and resolving the tag.

The communication mechanism between the DC block 120 and data agents 110a-d is generally not fixed. The DC block 120 thus may use different communication mechanism to invoke and control different data agents 110a-d. The communication mechanism generally depends on the platform of the target system and technology in which data agent 110a-d is developed.

The DC block 120 and data agents block 110 are both generally implemented by a processor 125 having associated memory 126 that stores a disclosed data collection algorithm 126a run by the processor 125. The processor 125 can comprise a microprocessor, digital signal processor (DSP), or microcontroller unit (MCU). Processor 125 can run or execute data collection algorithm 126a in order to collect engineering configuration data (ECD 166a-d in FIG. 1B) in a variety of data formats and translate the engineering configuration data into one common generic data format (translated ECD 134).

An application server 140 is connected to data server 130. Application server 140 includes a processor 141. The application server 140 provides the interface between the user interface layer and the ECD collection system 100. Upon receiving the request for initiation of ECD collection by a user, application server 130 prepares a list of C&I systems from which data needs to be collected and passes the request to the ECD collection system 100. The application server 130 also sends the connectivity details that need to be used for data collection.

A user 145 is shown using user interface (UI) application 142 (such as in a control room) which upon an input by the user initiates an ECD collection request to the DC block 120. In one embodiment, a DC configuration file is generated that is passed to ECD collection system 100 where it is stored as DC configuration file 120b. DC configuration file 120b stores the list of C&I systems from which data needs to be collected. It stores connectivity information that needs to be used to connect to the C&I system. It also stores credentials that will be used by data agents to get access to the C&I system's ECD.

The common generic format has representations for objects, connections and associations found in IFs. Objects have attributes that identify and describe them. Objects can be physical entities including Controllers, PLCs, Chassis, Racks, I/Os, Servers, Workstations or switches. Another set of objects is logical entity including installed application, control logic, batch control, ladder logic, safety logic, history references or human machine interface (HMI) references. The objects can be connected to exchange data and control, these are represented by connections. The connections represent a physical connection or a logical connection between two objects. Network connection between a controller and a server is an example of physical connection. Connection between two control logic to exchange data represents logical connection. The common generic format to store ECD enables a single information source being used to store ECD collected from different C&I systems. Additionally, a common format can be applied across the various C&I systems leads to uniform engineering and maintenance practices.

Data server 130 represents the information system that includes a memory 130a that stores the translated ECD 134 that is collected from the various C&I systems. It guarantees (where at any point if the collected ECD has any error it is not stored as persisted by the information system and does not overwrite or corrupt other data) the atomicity, consistency, isolation and durability of collected snapshot ECD. The data server 130 provides the necessary interfaces that can be used by an application server 140 to access the stored C&I system configuration data stored as ECD 134.

The data collection algorithm 126a executing on processor 125 parses the received ECD 166a-d via data parsers 121a-d. The DC block 120 sends a message to start the parsing after the collection of ECD is completed by the data agents. Data parsers 121a-d translate the collected ECD 166a-d having different formats into a single common generic format (translated ECD 134).

Figure 2:
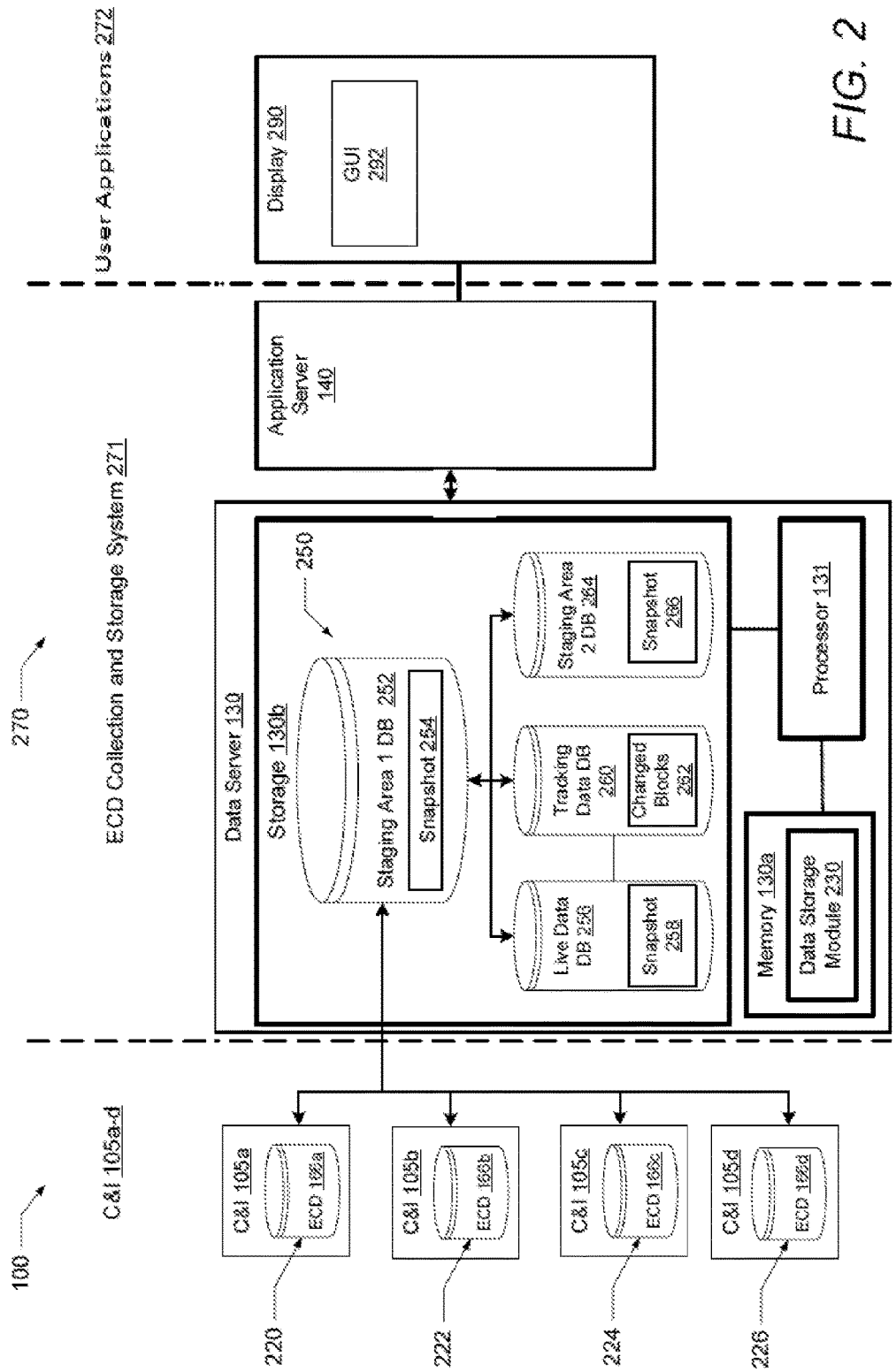
FIG. 2 is a diagrammatic view of an example framework of hardware and software components including a system for detecting and tracking changes in ECD for an IF including a plurality of C&I systems, according to an example embodiment.

FIG. 2 illustrates an example framework 270 of hardware and software components of system 100 for detecting and tracking changes in ECD that has been collected from C&I systems 105a-d. Framework 270 comprises C&I systems 105a-d, ECD storage and collection system 271 and user applications 272. User applications 272 execute on application server 140 and provide a user interface layer which acts as an interface between the application server 140 and a user. Using user applications 272, a user can interact with the data server 130 to store, retrieve and view data in the data collection server. The user can view the data on display 290 via GUI 292.

C&I systems 105a-d comprise C&I system 105a having a storage device 220 that stores ECD 166a, C&I system 105b having a storage device 222 that stores ECD 166b, C&I system 105c having a storage device 224 that stores ECD 166c and C&I system 105d having a storage device 226 that stores ECD 166d. In one embodiment, storage devices 222-226 can be hard drives that have multiple databases thereon.

Data server 130 comprises processor 131, memory 130a, data storage module 230 and storage 130b. Storage 130b can be a hard drive that contains multiple databases 250 thereon. Databases 250 include staging area 1 database 252 that store one or more updated snapshots 254 collected from C&I systems 105a-d and live data database 256 that store one or more reference snapshots 258 which each have timestamps.

Databases 250 further include tracking data database 260 that store one or more changed blocks of data 262 and staging area 2 database 264 that store one or more snapshots 266.

Staging area 1 database 252 is a temporary storage area where updated snapshot 254 data is stored after data collection from C&I systems 105a-d. Each piece of information in updated snapshot 254 collected from the C&I systems has associated alphanumeric information which is used in unique identification. The unique identification information is built using the information collected for in object. These record identifiers are also used as a means to resolve references of information in other records.

Live data database 256 is the final destination where the reference snapshot 258 data is stored. Updated snapshot 254 from staging area 1 database 252 is moved to live data database 256 after processing. The contents of live data database 256 always reflect the data from the latest snapshot taken in time. The snapshot data for the initial or first snapshot (earliest snapshot) is completely stored in the live data database 256. The second snapshot onwards only stores updated or changed information. The updated information can include addition, deletion or modifications to the existing information and data. Each piece of information stored in the live data database 256 has an associated attribute which indicates the snapshot in which it was last modified. If a piece of information is not updated in the new snapshot then the snapshot attribute will not change. This helps in preparing view of a collected data for a particular snapshot.

Tracking data database 260 stores information about the updates or changes that are made in the snapshot as changed blocks 262. The information in the tracking data database 260 helps in tracking the changes that have happened in the various snapshots. For each modification detected in the new snapshot a tracking record (changed blocks 262) is created. The tracking record describes the modification type which could be addition, deletion or update. Changed blocks 262 stores information about the snapshot in which the change happened, changed data information along with the time stamp. For an update operation it also stores the information about the data before and after the change. Data insertion in the live data database 256 and tracking data database 260 is done in a single transaction so that if there is some failure the changes made to the live data database and tracking data database can be rolled back.

Updated snapshots 254 from staging area 1 database 252 are copied or moved to the staging area 2 database 264 and stored as snapshots 266 after the snapshot processing is completed in the data server 130. Processor 131 can execute data storage module 230 in order to process snapshots within data collection server 130.

Snapshot processing is completed after the snapshots are stored to the live data database 256 and the tracking data database 260. The data in the snapshots 266 of staging area 2 database 264 are used when data collected from the last snapshot is used. This can happen when a user commands the system to ignore the data collection of the system and to substitute data from last snapshot. This can be needed if an IF is taken offline or it is unreachable due to a fault condition.

In one embodiment, processor 131 executes data storage module 230 to retrieve an updated snapshot 254 of collected ECD data having a common generic data format from a staging area 1 database 252. A reference snapshot 258 of previously collected ECD having the common generic data format is retrieved from a live data database 256 and the updated snapshot 254 of the collected ECD is compared to the reference snapshot 258 of the collected ECD. Changed blocks 262 of data that have been changed between the updated snapshot 254 and the reference snapshot 258 are identified and the changed blocks 262 that have been changed are stored to a tracking data database 260. The reference snapshot 258 of previously collected ECD stored on the live data database 256 is modified using the changed blocks 262 of data that have been changed and the updated snapshot 254 is copied or moved from the staging area 1 database 252 to a staging area 2 database 264 and stored as snapshot 266.

Changes in newly received snapshots (i.e. snapshot 254) are found by comparing collected snapshot data which is stored in the staging area 1 database with the live data database. The snapshot in the live data database is used in the comparison because the snapshot in the live data database represents the last snapshot collected. Each piece of information stored in the staging area 1 database and the live data database has an identifier (ID) and hash value associated with it. The ID uniquely identifies a piece of information in the snapshot. The hash value on the other hand is calculated from the content of information and is later used for comparison.

The following are possible outcomes when the content of snapshots from the live data database and staging area 1 database are compared using a comparison method that generally comprises the hash method, where when two objects are equal, they must have the same hash value.

1. When ID is present in the snapshot of staging area 1 database, but not in the snapshot of live data database, it indicates that information is newly added in the latest snapshot.

2. When ID is not present in the snapshot of staging area 1 database, but is in the snapshot of the live data database, it indicates that information is deleted.

3. When information is present in both the snapshot of staging area 1 database and the snapshot of the live data database, staging and live then there are two possibilities:

a. When their hash value matches it indicates that there is no change in the information.

b. When their hash value does match it indicates an update.

Changes that are identified in the comparison process are recorded in the live data database the tracking data database. The updates are made in snapshots of the live data database to match the latest snapshot data. The tracking is updated with the details of the change. Only changes in snapshot are that detected are recorded in storage 130b instead of the full set of data for all the C&I systems. This is called storing the delta change and avoids the storage of large amounts of redundant information which would occur if the full data is stored for each snapshot that is taken. This method also enables storing of large number of snapshots simultaneously without the need for archival.

Figure 3:
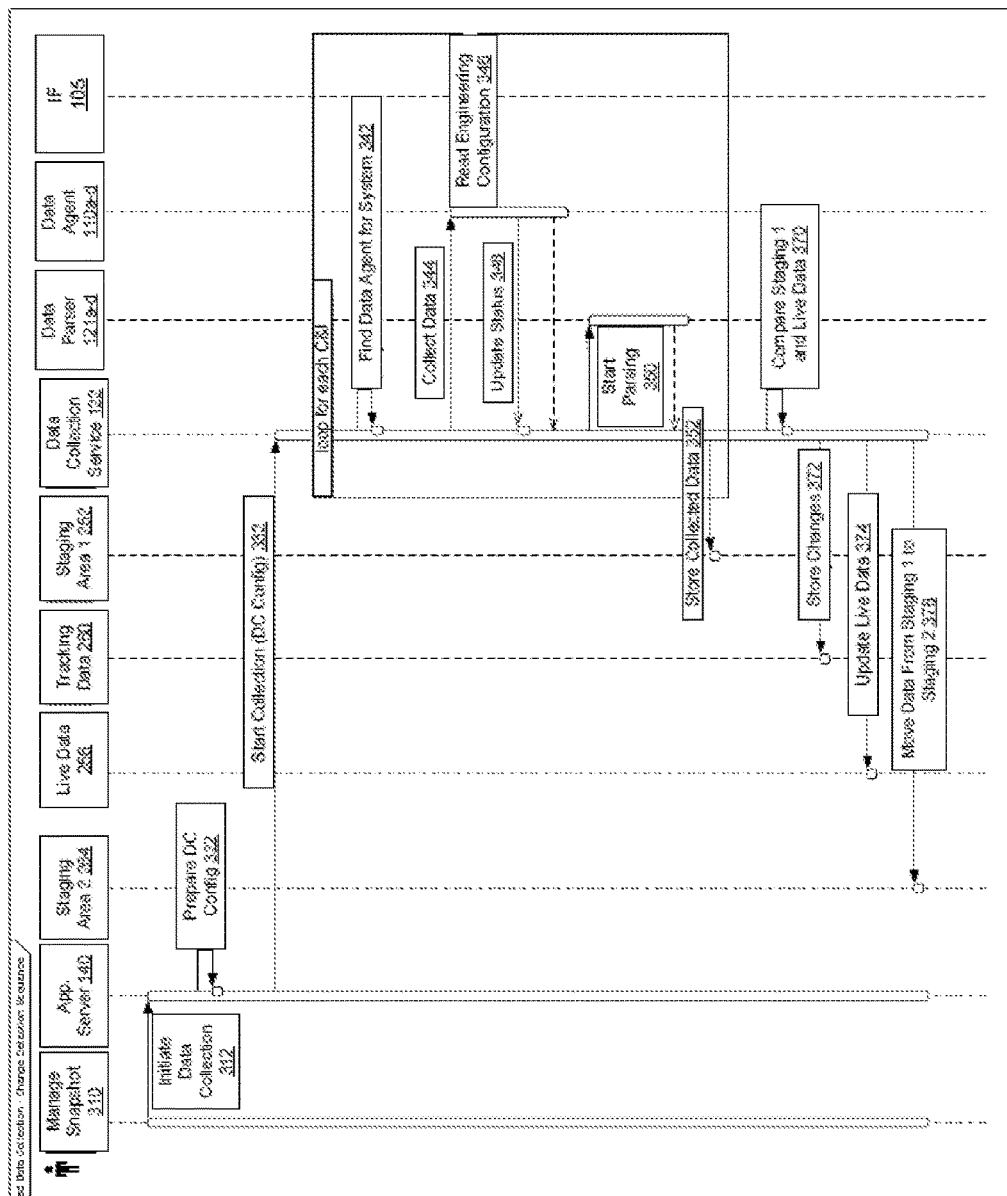
FIG. 3 illustrates a sequence of calls or requests exchanged between the components of the framework of FIGS. 1A and 2 when data collection is initiated.

FIG. 3 illustrates a sequence of calls or requests 300 exchanged between the components of the data collection framework of FIGS. 1A and 2 when data collection is initiated. The calls or requests are arranged along the timeline from top to bottom and also numbered in the temporal order they occur.

Data collection is initiated when a user places a request using the manage snapshot 310 user interface. Call or messages that are generated upon this request are described as follows. At initiate data collection 312, manage snapshot 310, via UI 142, sends a message to application server 140 to start the data collection activity. At prepare DC configuration 322, the DC configuration file 120b is prepared. The DC configuration file 120b will have a list of C&I systems from which ECD 166a-d needs to be collected. The DC configuration file 120b will also have the connectivity details.

At start collection 332, the ECD collection system 100 starts to collect ECD with the DC configuration file 120b as an input. Steps 342 to 352 are repeated for each C&I system 105a-d whose ECD is to be collected. At find data agent for system 342, the ECD collection system 100 looks into the list of registered data agents 120a to find the one that is applicable for the current respective C&I system. At collect data 344, ECD collection system 100 sends a message to a respective one of data agents 110a-d along with the connectivity details.

At read ECD 346, the data agent starts reading the ECD from the respective C&I systems within the IF 105. At update status 348, the data agent sends a status update message back to ECD collection system 100 asynchronously to indicate the current status and progress of data collection. At start parsing 350, the ECD collection system 100 sends a message to one of the respective data parsers 121a-d after data collection activity has been completed by the data agent. The data parser translates the collected ECD into a common generic format of translated ECD 134.

At store collected data 352, the ECD collection system 100 sends a message to store the translated ECD 134 with a timestamp at the data server 130 as after the data parser has completed the translation. The translated ECD 134 in the common generic format is stored in storage 130b of data server 130. Steps 342 to 352 are repeated for each C&I system 105a-d whose ECD is to be collected. The data collection for all of the C&I systems 105a-d is complete after ECD 166a-d is collected from all the C&I systems 105a-d. The collected ECD is stored as updated snapshot 254 of staging area 1 database 252. At compare staging area 1 and live data 370, the reference snapshot 258 data of live data database 256 is compared to the updated snapshot 254 data of staging area 1 database 252. Changed blocks 262 of ECD that have been changed between the reference snapshot data and the updated snapshot data are identified and stored to tracking data database 260 at store changes 372. At update live data 374, the reference snapshot 258 data of live data database 256 is modified or updated using the changed blocks 262 of ECD that have been changed and stored. At move data from staging area 1 to staging area 2 376, the updated snapshot 254 of staging area 1 database 252 is copied to snapshot 266 data of staging area 2 database 264 and the updated snapshot 254 of staging area 1 database 252 is erased.

Figure 4:
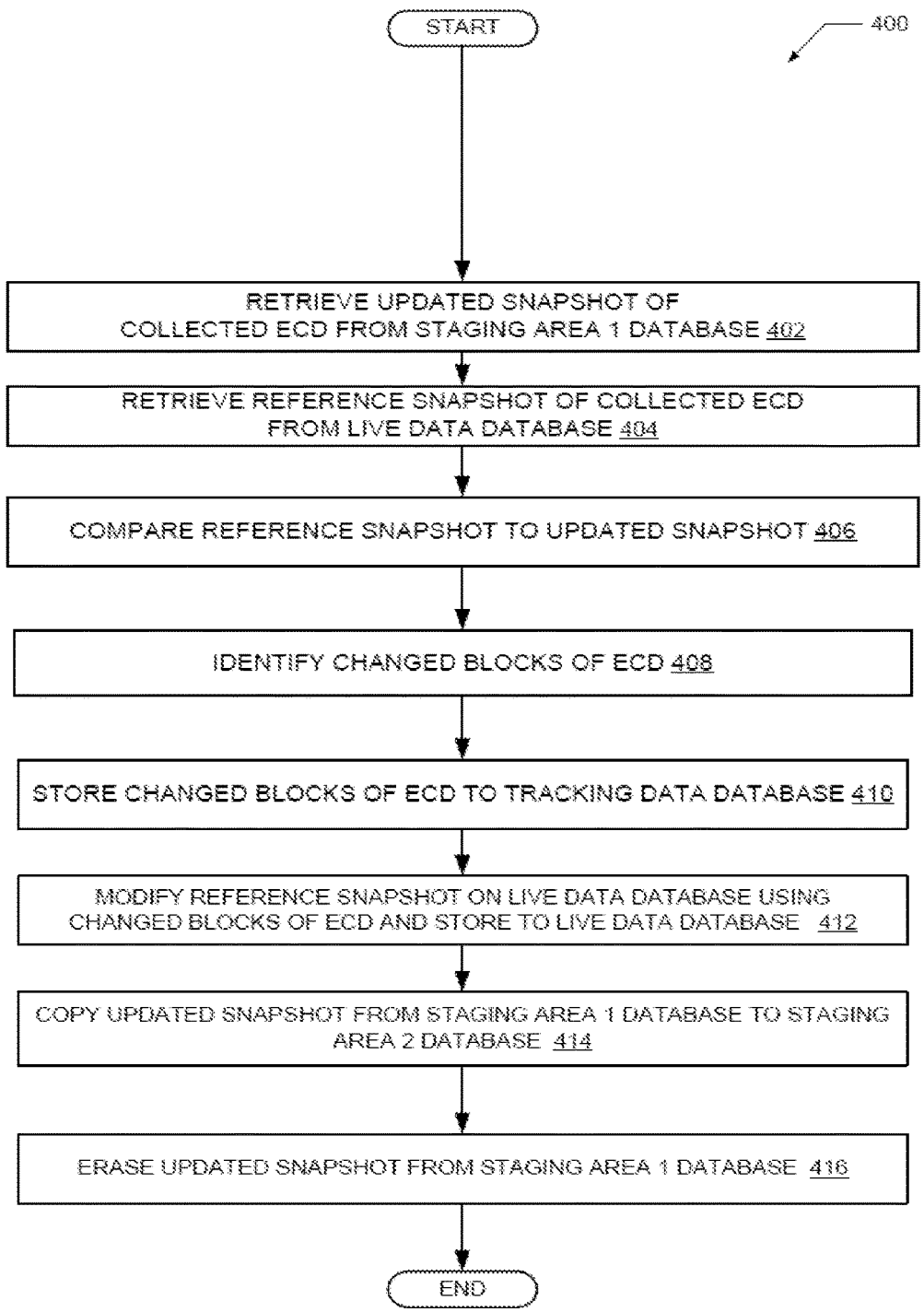
FIG. 4 is a flow chart that shows steps in an example method of detecting and tracking ECD for an IF, according to an example embodiment.

FIG. 4 is a flow chart showing steps in an example method 400 of automatically detecting and tracking changes in ECD for an a plurality of C&I systems in an IF that collectively utilize a plurality of different data formats for storing their respective ECD. With reference to FIGS. 1A-4, method 400 can be implemented via the execution of data storage module 230 by processor 131. Method 400 begins at the start block and proceeds to block 402. At block 402, processor 131 retrieves updated snapshot 254 of collected ECD data having a later timestamp at second time from staging area 1 database 252 at a first time. A reference snapshot 258 of previously collected ECD having an earlier timestamp is retrieved from live data database 256 at a first time earlier than the second time (block 404).

The ECD of the updated snapshot 254 and reference snapshot 258 are compared (block 406). Changed blocks 262 of data that have been changed between the updated snapshot 254 and the reference snapshot 258 are identified (block 408) and the changed blocks 262 of data that have been changed are stored to a tracking data database 260 (block 410).

The reference snapshot 258 stored on the live data database 256 is modified using the changed blocks 262 of data that have been changed and stored to live data database 256 (block 412). The updated snapshot 254 is copied or moved from the staging area 1 database 252 to a staging area 2 database 264 and stored as snapshot 266 (block 414). The updated snapshot 254 is removed or erased from the staging area 1 database 252 (block 416). Method 400 then ends.

Figure 5:
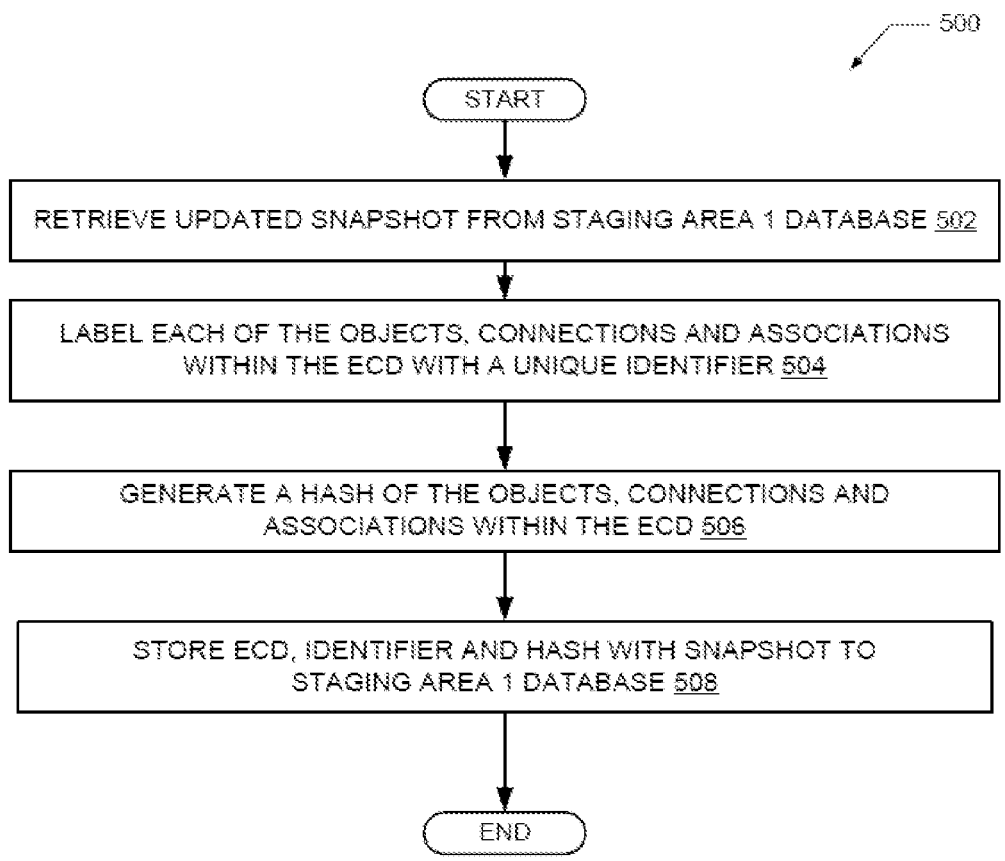
FIG. 5 is a flow chart showing steps in an example method of labeling ECD within a snapshot with unique identifiers, according to an example embodiment.

FIG. 5 is a flow chart showing steps in an example method 500 of labeling ECD within a snapshot with unique identifiers. With reference to FIGS. 1A-5, method 500 can be implemented via the execution of data storage module 230 by processor 131. Method 500 begins at the start block and proceeds to block 502. At block 502, processor 131 retrieves updated snapshot 254 having a common generic format from staging area 1 database 252. Processor 131 labels each of the objects, connections and associations within the common generic format of the ECD with a unique identifier (block 504). Processor 131 generates a hash value associated with the identifier for each instance of the objects, connections and associations within the ECD (block 506). Processor 131 stores the updated snapshot 254 along with the associated unique identifiers and hash values to staging area 1 database 252 (block 508). Method 500 then ends.

Figure 6:
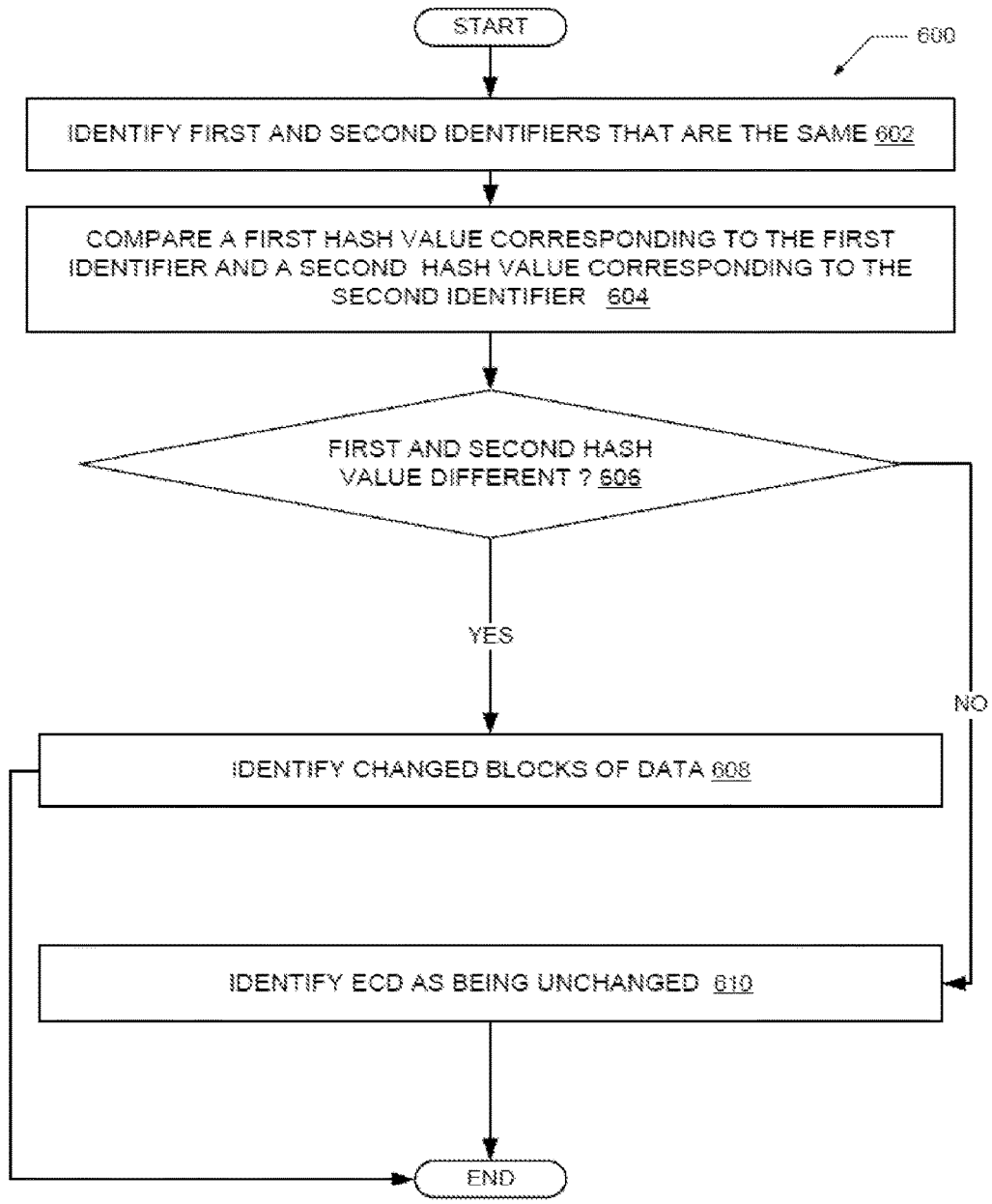
FIG. 6 is a flow chart showing steps in an example method of identifying changed blocks of data within snapshots, according to an example embodiment.

FIG. 6 is a flow chart showing steps in an example method 600 of automatically identifying changed blocks 262 of data within snapshots. This corresponds to block 508 of FIG. 5. With reference to FIGS. 1A-6, method 600 can be implemented via the execution of data storage module 230 by processor 131. Method 600 begins at the start block and proceeds to block 602. Processor 131 has previously retrieved snapshots 254 and 258. Processor 131 identifies a first identifier and a second identifier in the ECD of snapshots 254 and 258 that are the same (block 602). Processor 131 compares a first hash value corresponding to the first identifier and a second hash value corresponding to the second identifier (block 604).

Processor 131 determines if the first hash value and the second hash value are different (decision block 606). In response to the first hash value and the second hash value being different, processor 131 identifies changed blocks 262 of data associated with the first and second identifier as being changed (block 608). Method 600 then ends. In response to the first hash value and the second hash value being the same, processor 131 identifies data associated with the first and second identifier as being unchanged (block 610). Method 600 then ends.

While various disclosed embodiments have been described above, it should be understood that they have been presented by way of example only, and not limitation. Numerous changes to the subject matter disclosed herein can be made in accordance with this Disclosure without departing from the spirit or scope of this Disclosure. In addition, while a particular feature may have been disclosed with respect to only one of several implementations, such feature may be combined with one or more other features of the other implementations as may be desired and advantageous for any given or particular application.

As will be appreciated by one skilled in the art, the subject matter disclosed herein may be embodied as a system, method or computer program product. Accordingly, this Disclosure can take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, this Disclosure may take the form of a computer program product embodied in any tangible medium of expression having computer usable program code embodied in the medium.

Any combination of one or more computer usable or computer-readable medium(s) may be utilized. The computer-usable or computer-readable medium may be, for example, but not limited to, an electronic, magnetic, optical, electromagnetic, infrared, or semiconductor system, apparatus, or device. More specific examples (a non-exhaustive list) of the computer-readable medium would include non-transitory media including the following: an electrical connection having one or more wires, a portable computer diskette, a hard disk, a random access memory (RAM), a read-only memory (ROM), an erasable programmable read-only memory (EPROM or Flash memory), a portable compact disc read-only memory (CDROM), an optical storage device, or a magnetic storage device.

The invention claimed is:

1. A method of detecting and tracking changes in engineering configuration data (ECD) for an industrial facility (IF), comprising:
    said IF including a first control and instrumentation (C&I) system utilizing a first data format for its first ECD and at least a second C&I system utilizing a second data format for its second ECD different from said first data format, said first ECD and said second ECD each including representations for objects, connections, and associations, wherein the objects including physical and logical entities, the physical entities including at least one of Controllers, PLCs, Chassis, Racks, I/Os, Servers, Workstations or Switches, and the logical entities including at least one of installed application, control logic, batch control, ladder logic, safety logic, history references or human machine interface (HMI) references;
    converting, by a processing device, said first ECD and said second ECD each obtained at a first time into a common format;
    storing, in a storage device associated with said processing device, said first ECD and said second ECD obtained at said first time together as reference snapshot data with a timestamp reflecting said first time in a single information source that uses said common format, wherein said single information source comprises a first database that stores said reference snapshot data and said updated snapshot data is stored on a separate second database;
    obtaining, by said processing device, at a second time after said first time said first ECD and said second ECD;
    converting, by said processing device, said first ECD and said second ECD obtained at said second time into said common format to collectively provide updated snapshot data having said common format;
    detecting, by said processing device, change(s) between said first ECD and said second ECD obtained at said first time and said first ECD and said second ECD obtained at said second time by comparing said reference snapshot data to said updated snapshot data,
    identifying, by said processing device, first blocks of ECD that have been changed between said reference snapshot data and said updated snapshot data;
    storing said first blocks of ECD that have been changed to a third database;
    modifying, by said processing device, said reference snapshot data using said first blocks of ECD that have been changed; and
    storing modified reference snapshot data to said first database.

2. The method of claim 1, further comprising:
    copying said updated snapshot data from said second database to a fourth database;
    erasing said updated snapshot data from said second database.

3. The method of claim 1, further comprising:
    generating a hash value for each received instance of said objects, said connections and said associations.

4. The method of claim 3, further comprising:
    identifying a first identifier and a second identifier in said ECD that are the same;
    comparing a first hash value corresponding to said first identifier and a second hash value corresponding to said second identifier;
    determining if said first hash value and said second hash value are different;
    in response to said first hash value and said second hash value being different, identifying ECD associated with said first and second identifier as being changed.

5. The method of claim 4, further comprising:
    in response to said first hash value and said second hash value being the same, identifying ECD associated with said first and second identifier as being unchanged.

6. A system of detecting and tracking changes in engineering configuration data (ECD) for an industrial facility (IF), comprising:
    a data server including a first processor connected to a memory device having a first non-transitory machine-readable storage medium storing a data storage module, wherein said processor executes said data storage module causing said data server to:
    said IF including a first control and instrumentation (C&I) system utilizing a first data format for its first ECD and at least a second C&I system utilizing a second data format for its second ECD different from said first data format, said first ECD and said second ECD each including representations for objects, connections, and associations, wherein the objects including physical and logical entities, the physical entities including at least one of Controllers, PLCs, Chassis, Racks, I/Os, Servers, Workstations or Switches, and the logical entities including at least one of installed application, control logic, batch control, ladder logic, safety logic, history references or human machine interface (HMI) references;
    converting, by said processor, said first ECD and said second ECD, each obtained at a first time into a common format;
    storing, in a storage device associated with said processor, said first ECD and said second ECD obtained at said first time together as reference snapshot data with a timestamp reflecting said first time in a single information source that uses said common format, wherein said single information source comprises a first database that stores said reference snapshot data and said updated snapshot data is stored on a separate second database;
    obtaining, by said processor, at a second time after said first time said first ECD and said second ECD;
    converting, by said processor, said first ECD and said second ECD obtained at said second time into said common format to collectively provide updated snapshot data having said common format; and detecting, by said processor, change(s) between said first ECD and said second ECD obtained at said first time and said first ECD and said second ECD obtained at said second time by comparing said reference snapshot data to said updated snapshot data;

identifying, by said processor, first blocks of ECD that have been changed between said reference snapshot data and said updated snapshot data;

storing said first blocks of ECD that have been changed to a third database;

modifying, by said processor, said reference snapshot data using said first blocks of ECD that have been changed; and storing modified reference snapshot data to said first database.

7. The system of claim 6, wherein said data storage module further causes said data server to:
copy said updated snapshot data from said second database to a fourth database;
erase said updated snapshot data from said second database.

8. The system of claim 6, wherein said data storage module further causes said data server to:
generate a hash value for each received instance of said objects, said connections and said associations.

9. The system of claim 8, wherein said data storage module further causes said data server to:
identify a first identifier and a second identifier in said ECD that are the same;
compare a first hash value corresponding to said first identifier and a second hash value corresponding to said second identifier;
determine if said first hash value and said second hash value are different;
in response to said first hash value and said second hash value being different, identify ECD associated with said first and second identifier as being changed.

10. The system of claim 9, wherein said data storage module further causes said data server to:
in response to said first hash value and said second hash value being the same, identify ECD associated with said first and second identifier as being unchanged.

11. A computer program product, comprising:
a non-transitory data storage medium that includes program instructions executable by a processor to enable said processor to execute a method of detecting and tracking changes in engineering configuration data (ECD) for an industrial facility (IF), said computer program product comprising:
said IF including a first control and instrumentation (C&I) system utilizing a first data format for its first ECD and at least a second C&I system utilizing a second data format for its second ECD different from said first data format, said first ECD and second ECD each including representations for objects, connections, and associations, wherein the objects including physical and logical entities, the physical entities including at least one of Controllers, PLCs, Chassis, Racks, I/Os, Servers, Workstations or Switches, and the logical entities including at least one of installed application, control logic, batch control, ladder logic, safety logic, history references or human machine interface (HMI) references;
code for converting said first ECD and said second ECD, each obtained at a first time into a common format;
code for storing said first ECD and said second ECD obtained at said first time together as reference snapshot data with a timestamp reflecting said first time in a single information source that uses said common format;
code for obtaining at a second time after said first time said first ECD and said second ECD;
code for converting said first ECD and said second ECD obtained at said second time into said common format to collectively provide updated snapshot data having said common format;
code for detecting change(s) between said first ECD and said second ECD obtained at said first time and said first ECD and said second ECD obtained at said second time by comparing said reference snapshot data to said updated snapshot data;
code for identifying first blocks of ECD that have been changed between said reference snapshot data and said updated snapshot data;
code for storing said first blocks of ECD that have been changed to a third database;
code for modifying said reference snapshot data using said first blocks of ECD that have been changed; and
code for storing modified reference snapshot data to said first database.

12. The computer program product of claim 11, wherein said computer program product further comprises:
code for generating a hash value for each received instance of said objects, said connections and said associations.

13. The computer program product of claim 12, wherein said computer program product further comprises:
code for identifying a first identifier and a second identifier in said ECD that are the same;
code for comparing a first hash value corresponding to said first identifier and a second hash value corresponding to said second identifier;
code for determining if said first hash value and said second hash value are different;
in response to said first hash value and said second hash value being different, code for identifying ECD associated with said first and second identifier as being changed.

* * * * *